United States Patent
Liu et al.

(10) Patent No.: US 10,703,660 B2
(45) Date of Patent: Jul. 7, 2020

(54) METHOD AND SYSTEM FOR TREATMENT OF ORGANIC CONTAMINANTS BY COUPLING FENTON REACTION WITH MEMBRANE FILTRATION

(71) Applicant: CITIC Envirotech Ltd, Singapore (SG)

(72) Inventors: Jianlin Liu, Singapore (SG); Kai Yin Melvin Tang, Singapore (SG)

(73) Assignee: CITIC Envirotech Ltd, Singapore (SG)

( * ) Notice: Subject to any disclaimer, the term of this patent is extended or adjusted under 35 U.S.C. 154(b) by 218 days.

(21) Appl. No.: 15/724,271

(22) Filed: Oct. 4, 2017

(65) Prior Publication Data

US 2019/0039929 A1 Feb. 7, 2019

(30) Foreign Application Priority Data

Aug. 4, 2017 (SG) .............................. 10201706401P

(51) Int. Cl.

| C02F 1/66 | (2006.01) |
|---|---|
| C02F 1/72 | (2006.01) |
| C02F 101/30 | (2006.01) |
| C02F 101/36 | (2006.01) |
| C02F 9/00 | (2006.01) |
| C02F 1/20 | (2006.01) |

(Continued)

(52) U.S. Cl.
CPC .................. *C02F 9/00* (2013.01); *C02F 1/20* (2013.01); *C02F 1/444* (2013.01); *C02F 1/66* (2013.01); *C02F 1/68* (2013.01); *C02F 1/722* (2013.01); *C02F 2101/30* (2013.01); *C02F 2101/36* (2013.01); *C02F 2301/046* (2013.01); *C02F 2303/16* (2013.01); *C02F 2305/026* (2013.01)

(58) Field of Classification Search
None
See application file for complete search history.

(56) References Cited

U.S. PATENT DOCUMENTS

| 2002/0117392 A1* | 8/2002 | Noguchi | .................... C02F 1/32 |
| | | | 204/157.15 |
| 2005/0000908 A1* | 1/2005 | Karlsson | ................. C02F 1/722 |
| | | | 210/722 |

(Continued)

FOREIGN PATENT DOCUMENTS

| CA | 2321503 A1 | 8/1999 |
| CN | 102358651 A | 2/2012 |

(Continued)

OTHER PUBLICATIONS

Primo, Oscar et al—"An Integrated Process, Fenton-Reaction-Ultrafiltration, for treatment of Landfill Leachate"—Ind. Eng. Chem. Res., 2008 (Year: 2008).*

(Continued)

*Primary Examiner* — Bradley R Spies
(74) *Attorney, Agent, or Firm* — Pyprus Pte Ltd

(57) ABSTRACT

An organic contaminants treatment system comprises a first pH adjustment tank, a Fenton reaction tank, an $H_2O_2$ purging tank, a second pH adjustment tank, a holding tank, and a membrane tank. An organic contaminants treatment method couples Fenton reaction and membrane filtration.

10 Claims, 6 Drawing Sheets

(51) Int. Cl.
*C02F 1/44* (2006.01)
*C02F 1/68* (2006.01)

(56) References Cited

U.S. PATENT DOCUMENTS

| | | | | |
|---|---|---|---|---|
| 2009/0145773 A1* | 6/2009 | Herrington | ............ | B01D 65/02 |
| | | | | 205/687 |
| 2017/0216777 A1* | 8/2017 | Aketagawa | ............ | C02F 3/1268 |
| 2018/0251386 A1* | 9/2018 | Wang | ............ | E21B 43/40 |

FOREIGN PATENT DOCUMENTS

| CN | 102976511 A | 3/2013 | | |
|---|---|---|---|---|
| CN | 104529026 A | 4/2015 | | |
| CN | 104671502 A | 6/2015 | | |
| CN | 205011523 U | 2/2016 | | |
| CN | 105645639 A | 6/2016 | | |
| CN | 105858978 A | 8/2016 | | |
| WO | WO-2016031331 A1 * | 3/2016 | ............ | B01D 61/20 |
| WO | WO-2017039859 A1 * | 3/2017 | ............ | E21B 43/40 |

OTHER PUBLICATIONS

Search Report and Written Opinion of Singapore application No. 10201706401P dated Jul. 9, 2018 (11 pages).

Office Action of Taiwan application No. 106135047 dated Jul. 3, 2018 (5 pages).

Liang et al, Coupling Cathodic Electro-Fenton Reaction to Membrane Filtration for A07 Dye Degradation, Journal of Membrane Science, vol. 510 pp. 182-190, Mar. 2, 2016.

* cited by examiner

US 10,703,660 B2

METHOD AND SYSTEM FOR TREATMENT OF ORGANIC CONTAMINANTS BY COUPLING FENTON REACTION WITH MEMBRANE FILTRATION

FIELD OF THE INVENTION

The present invention relates to the environmental technology, and more specifically to a method and system for treatment of organic contaminants by coupling Fenton reaction with membrane filtration.

BACKGROUND OF THE INVENTION

Fenton oxidation is an advanced oxidation process (AOP) that is used to oxidize contaminants such as Trichloroethylene (TCE) and Tetrachloroethylene (Perchloroethylene, PCE) in wastewater. The chemical reagent used in Fenton oxidation is known as the Fenton reagent—a solution of hydrogen peroxide and ferrous iron catalyst that was developed in the 1890s by HJH Fenton [1, 2].

In the Fenton reaction, catalyst in the form of transition metals such as iron must be present to initiate the reaction. Iron(II) is oxidized by hydrogen peroxide to iron(III), forming a hydroxyl radical and a hydroxide ion in the process:

$$Fe^{2+} + H_2O_2 \rightarrow Fe^{3+} + HO\cdot + OH^- \qquad (1)$$

The free radical generated by this process is a powerful, non-selective oxidant. Oxidation of an organic compound by Fenton's reagent is rapid, exothermic and results in the oxidation of contaminants to carbon dioxide and water primarily [1, 2].

In the conventional Fenton oxidation process, ferrous ions are continuously added to sustain the reaction. Consequently, ferric ions become in excess and are removed from the system via precipitation and sedimentation after the pH is adjusted to between 8-9. The conventional Fenton oxidation system 100 as shown in FIG. 1 comprises a $1^{st}$ pH adjustment tank 110 for adjusting the pH value of the wastewater to be treated by adding acidic reagent and dosing the wastewater with ferrous reagents, a Fenton reaction tank 120 for adding $H_2O_2$ to ferrous reagent-dosed wastewater and allowing Fenton reaction; an air purging tank 130 for purging the unreacted $H_2O_2$ and air bubbles generated during Fenton reaction, a $2^{nd}$ pH adjustment tank 140 for receiving caustic reagent to adjust the pH value of the air-purged wastewater, a coagulant dosage tank 150 for receiving coagulant reagents to form solids, and a sedimentation tank 160 for precipitating the solids.

In practical industrial applications, gravity-based solid-liquid separation has the following shortcomings:

1. Iron complexes and AOP by-products usually exists as tiny pin-flocs, which does not settle easily. Additional chemicals such as polyacrylamide (PAM) or other flocculants must be added to facilitate the gravitational separation.

2. Gas bubbles generated during Fenton reaction can attach to the flocs to cause buoyancy that hinders sedimentation. As a solution, a separate air purging tank is required.

3. Poor effluent qualities due to limitation of sedimentation

Microfiltration and Ultrafiltration processes are excellent alternatives to gravitational sedimentation because high pH ranges allow for iron complexes to exist in insoluble forms, which can be easily retained by the membranes to produce effluent qualities better than gravitational sedimentation. This is especially so when an active layer of rejected iron complexes have been formed on the membrane surface to provide enhanced iron complex rejection via charge repulsion [3, 4]. However, this active layer, which is also a membrane fouling layer, can render the process unsustainable if suction pressures are left unchecked. Thus, it is imperative to operate the Microfiltration or Ultrafiltration with appropriate preventive measures (via Maintenance Cleaning) to mitigate fouling.

The coupling of membrane filtration to Fenton Oxidation has been previously studied and reported to be a promising enhancement of the conventional counterpart. However, studies have been rather limited and mostly restricted to highly controlled laboratory-scale experiments treating model pollutants [5, 6]. The more relevant pilot-scale studies either utilized membrane filtration as a pre-treatment for downstream Fenton processes [7, 8], or en on the side of running non-representative experimental durations and an inability to demonstrate stable membrane performances [9].

SUMMARY OF THE INVENTION

One aspect of the present invention provides an organic contaminants treatment system. In one embodiment, the organic contaminants treatment system comprises a first pH adjustment tank for receiving influent, wherein the received influent contains organic contaminants; wherein the first pH adjustment tank receives an acidic reagent to adjust pH value of the received influent and a ferrous reagent to dose the received influent; a Fenton reaction tank fluidly coupled with the first pH adjustment tank; wherein the Fenton reaction tank receives the pH-adjusted and ferrous-dosed influent from the first pH adjustment tank and $H_2O_2$; thereby the received $H_2O_2$ and ferrous reagent undergo Fenton reaction in the Fenton reaction tank to produce .OH hydroxyl radicals; an $H_2O_2$ purging tank fluidly coupled with the Fenton reaction tank; wherein the $H_2O_2$ purging tank receives the Fenton reaction-treated influent and unreacted $H_2O_2$ within the influent is purged; a second pH adjustment tank fluidly coupled with the $H_2O_2$ purging tank; wherein the second pH adjustment tank receives the $H_2O_2$-purged influent from the $H_2O_2$ purging tank and a caustic reagent to adjust pH value of the $H_2O_2$-purged influent; a holding tank fluidly coupled with the second pH adjustment tank; wherein the holding tank receives the pH-adjusted influent from the second pH adjustment tank and houses a lifting means; and a membrane tank fluidly coupled with the holding tank via the lifting means; wherein the membrane tank houses microfiltration or ultrafiltration membranes, filters the pH adjusted influent from the holding tank into filtrate (i.e. water) and solids, and retains the solids.

In another embodiment of the organic contaminants treatment system, the acidic reagent received by first pH adjustment tank is selected from the group of commonly available acids.

In another embodiment of the organic contaminants treatment system, the pH value of the adjusted influent in the first pH adjustment tank is in the range of 2-6.

In another embodiment of the organic contaminants treatment system, the pH value of the adjusted influent in the first pH adjustment tank is in the range of 3-4.

In another embodiment of the organic contaminants treatment system, the ferrous reagent is ferrous sulphates.

In another embodiment of the organic contaminants treatment system, the Fenton reaction operates under the following ranges of chemical dosage ratios;

$$\frac{H_2O_2}{COD_{influent}} = 0.1 \to 5 \text{ and } \frac{Fe^{2+}}{H_2O_2} = 0.1 \to 5$$

In another embodiment of the organic contaminants treatment system, the unreacted $H_2O_2$ is purged by a blower through diffusers installed at the base of the $H_2O_2$ purging tank.

In another embodiment of the organic contaminants treatment system, the caustic reagent used in the second pH adjustment tank is sodium hydroxide.

In another embodiment of the organic contaminants treatment system, the pH value of the adjusted influent in the second pH adjustment tank is in the range of 7-10.

In another embodiment of the organic contaminants treatment system, the pH value of the adjusted influent in the second pH adjustment tank is in the range of 6-8.

In another embodiment of the organic contaminants treatment system, the solids from the membrane tank are recirculated to the first pH adjustment tank; and wherein recirculation rate is in range of 50%-700% influent flow rate, which is the flowrate of influent entering the first pH adjustment tank. In a further embodiment, the recirculation rate is in range of 300%-500% influent flow rate.

In another embodiment of the organic contaminants treatment system, it further comprises a product water tank fluidly coupled with the membrane tank to receive the water; wherein the water in the product water tank is used to backwash the microfiltration or ultrafiltration membranes. In further embodiment, the backwash is performed by sequential acidic and caustic washes. In yet another embodiment, the acidic wash uses a mixture of water and commonly available acids, and the caustic wash uses a mixture of water and sodium hypochlorite.

Another aspect of the present invention provides an organic contaminants treatment method. In one embodiment, the organic contaminants treatment method comprises: receiving from an external source an influent that contains organic contaminants; adjusting pH value of the received influent by acidic reagents and dosing the received influent with ferrous reagents; adding $H_2O_2$ into the pH-adjusted and ferrous-dosed influent for Fenton reaction; purging the $H_2O_2$ from the Fenton reaction-treated influent; adjusting the pH value of the $H_2O_2$-purged influent by a caustic reagent; filtering the caustic reagent-treated influent by filtration membrane to produce filtrate (i.e. water) and solids, wherein the solids are retained in a membrane tank; recirculating the solids from the membrane tank at a recirculation rate to the step of adjusting pH value of the received influent by acidic reagents and dosing the received influent with ferrous reagents; and backwashing the filtration membrane.

In another embodiment of the organic contaminants treatment method, the acidic reagent is selected from the group of commonly available acids in the industry.

In another embodiment of the organic contaminants treatment method, the pH value of the pH adjusted influents is in the range of 2-6.

In another embodiment of the organic contaminants treatment method, the pH value of the pH adjusted influents is in the range of 3-4.

In another embodiment of the organic contaminants treatment method, a range of chemical dosage ratios are used:

$$\frac{H_2O_2}{COD_{influent}} = 0.1 \to 5 \text{ and } \frac{Fe^{2+}}{H_2O_2} = 0.1 \to 5$$

In another embodiment of the organic contaminants treatment method, the caustic reagent for adjusting the pH value of the $H_2O_2$-purged influent is sodium hydroxide.

In another embodiment of the organic contaminants treatment method, the pH value of the caustic reagent-treated influent is in the range of 7-10.

In another embodiment of the organic contaminants treatment method, the pH value of the caustic reagent-treated influent is in the range of 6-8.

In another embodiment of the organic contaminants treatment method, the recirculation rate is in the range of 50%-700% influent flow rate, which is the flowrate of wastewater entering the first pH adjustment tank.

In another embodiment of the organic contaminants treatment method, the recirculation rate is in the range of 300%-500% influent flow rate, which is the flowrate of wastewater entering the first pH adjustment tank.

In another embodiment of the organic contaminants treatment method, the step of backwashing the filtration membrane is performed by sequential acidic and caustic washes.

In another embodiment of the organic contaminants treatment method, the acidic wash uses a mixture of water and commonly available acids, and the caustic wash uses a mixture of water and sodium hypochlorite.

In another embodiment of the organic contaminants treatment method, it further comprises air-scrubbing of the surface of the filtration membrane.

The objectives of and advantages of the invention will become apparent from the following detailed description of preferred embodiments thereof in connection with the accompanying drawings.

BRIEF DESCRIPTION OF THE DRAWINGS

Preferred embodiments according to the present invention will now be described with reference to the Figures, in which like reference numerals denote like elements.

DETAILED DESCRIPTION OF THE INVENTION

The present invention may be understood more readily by reference to the following detailed description of certain embodiments of the invention.

Throughout this application, where publications are referenced, the disclosures of these publications are hereby incorporated by reference, in their entireties, into this application in order to more fully describe the state of art to which this invention pertains.

The present invention provides a system for treatment of organic contaminants. Briefly, the organic contaminants treatment system is capable of integrated two-stages treatment of organic contaminants, i.e. Fenton Oxidation stage and membrane-filtration stage. The filtration can be microfiltration or ultrafiltration. The organic contaminants treatment system leverages on the production of .OH hydroxyl radicals by the Fenton reaction to provide strong but non-discriminatory oxidative degradation of organic substances in the influent.

Figure 2:
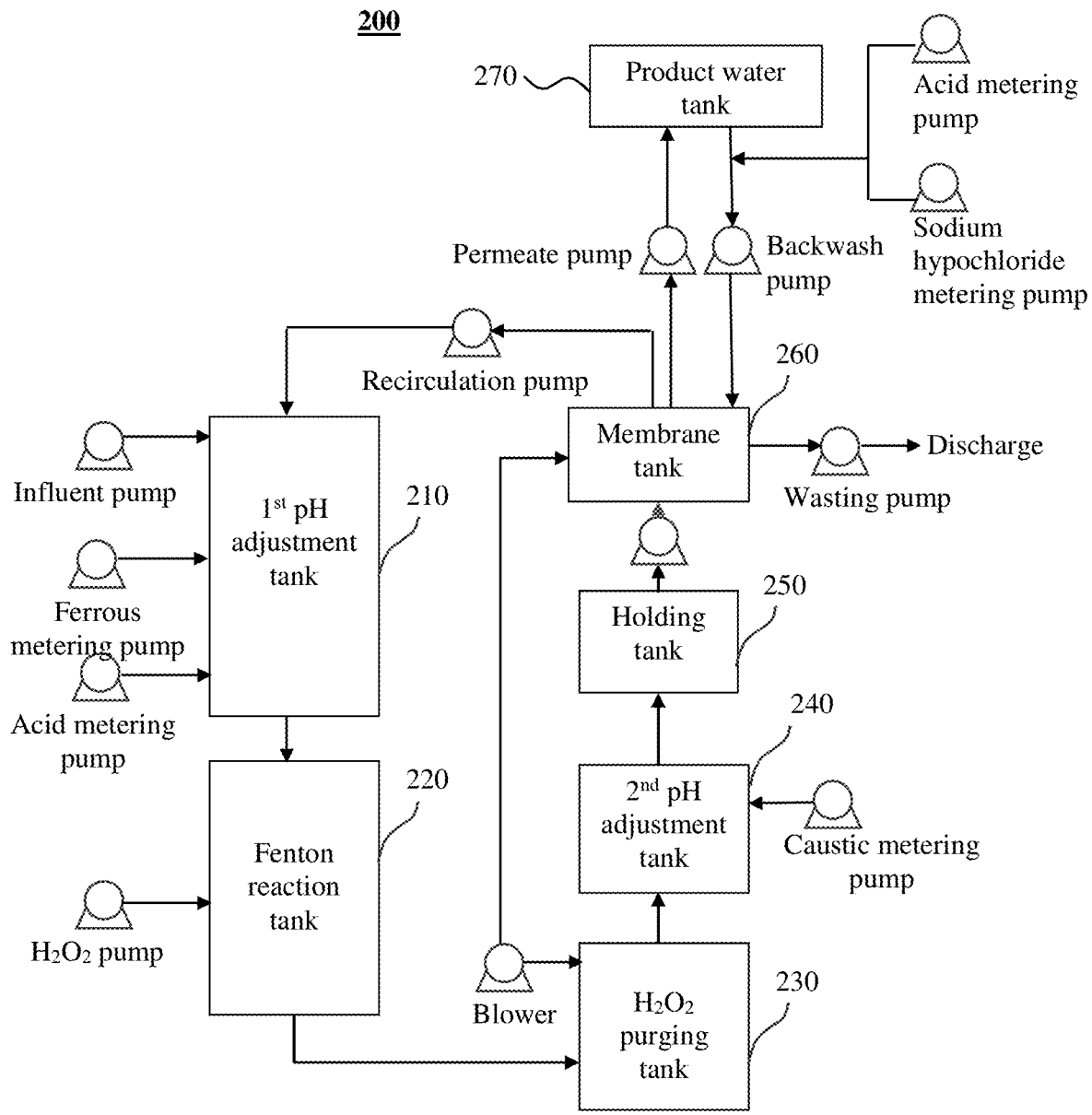
FIG. 2 shows a functional bloc diagram of an organic contaminants treatment system in accordance with embodiments of the present invention.

Referring now to FIG. 2, there is provided a functional bloc diagram of the organic contaminants treatment system in accordance with embodiments of the present invention. As shown in FIG. 2, the organic contaminants treatment system 200 comprises a first pH adjustment tank 210, a Fenton reaction tank 220, an $H_2O_2$ purging tank 230, a second pH adjustment tank 240, a holding tank 250, a membrane tank 260, and a product water tank 270.

The first pH adjustment tank 210 receives influent via an influent pump, where the received influent is from an external source (not shown) and contains organic contaminants. The exemplary influents that can be effectively treated by the present invention include wastewater streams from industrial processes, such as but not limited to petrochemical, tannery and pharmaceutical production. These wastewater streams have characteristically low biodegradability, which manifests as low biochemical oxygen demand (BOD) to chemical oxygen demand (COD) ratios (commonly known as B/C ratio) due to abundance of complex chemical structures in the influent. Then first pH adjustment tank 210 receives an acidic reagent via an acid metering pump, where the acidic reagent adjusts the pH value of the received influent. Acidic reagents that are suitable for the present invention include most commonly available acids in the industry. In certain embodiments, the pH value is in the range of 2-6, preferably in the range of 3-4. The first pH adjustment tank 210 also receives a ferrous reagent via a ferrous metering pump and undergoes thorough mixing. Ferrous sulphates are almost exclusively used as the ferrous reagent in the Fenton reaction, mostly due to its low costs and availability.

The Fenton reaction tank 220 is fluidly coupled with the first pH adjustment tank 210, and receives the pH-adjusted and ferrous-dosed influent from the first pH adjustment tank 210; then the Fenton reaction tank 220 receives $H_2O_2$ via a $H_2O_2$ pump, where the received $H_2O_2$ and ferrous reagent (from the upstream first pH adjustment tank 210) undergo Fenton reaction in the Fenton reaction tank 220 to produce .OH hydroxyl radicals, providing strong but non-discriminatory oxidative degradation of organic contaminants in the pH-adjusted influent. Iron complexes, contaminants, and oxidation by-products in the influent, if in the form of colloidal or suspended solids (collectively termed as "solids") are formed after Fenton reaction. In certain embodiments, the Fenton oxidation systems operate under the following range of chemical dosage ratios;

$$\frac{H_2O_2}{COD_{influent}} = 0.1 \to 5 \text{ and } \frac{Fe^{2+}}{H_2O_2} = 0.1 \to 5$$

The $H_2O_2$ purging tank 230 is fluidly coupled with the Fenton reaction tank 220, and receives the influent treated under the Fenton reaction from the Fenton reaction tank 220; the unreacted $H_2O_2$ within the influent received from the Fenton reaction tank 220 is purged by a blower through diffusers installed at the base of the $H_2O_2$ purging tank 230.

The second pH adjustment tank 240 is fluidly coupled with the $H_2O_2$ purging tank 230, and receives the $H_2O_2$-purged influent from the $H_2O_2$ purging tank 230; then the second pH adjustment tank 240 receives a caustic reagent via a caustic metering pump Sodium hydroxide, either in the form of caustic soda pearls or liquid form is preferred for this purpose of pH adjustment of the received $H_2O_2$-purged influent, where the caustic reagent adjusts the pH value of the received $H_2O_2$-purged influent. In certain embodiments, the pH value is in the range of 7-10, preferably in the range of 6-8.

The holding tank 250 is fluidly coupled with the second pH adjustment tank 240, and receives the pH-adjusted influent from the second pH adjustment tank 240; where the holding tank 250 holds the received pH-adjusted influent and houses a lifting pump that lifts the pH-adjusted influent into the membrane tank, overcoming the lack of gravity flow and providing a buffer volume to smoothen its hydraulic coupling with the membrane tank 260. The operation of the lifting pump is controlled by a level sensor located within the downstream membrane tank 260, which switches off the lifting pump when the water level within the membrane tank 260 reaches an operator-specified level.

The membrane tank 260 is fluidly coupled with the holding tank 250 via a lifting pump, where the membrane tank 260 houses microfiltration or ultrafiltration membranes that are chemically resistant to extreme acidic and caustic conditions (examples are PVDF membranes manufactured using the Thermally-Induced Phase Separation technique). Air scrubbing of the membrane surfaces within the membrane tank 260 is provided by the blower and is crucial to control the extent of foulant accumulation on the membrane surface—a phenomenon known as membrane fouling in the industry. It is beneficial to keep the membrane fouling phenomenon under control so as to confer operational stability to the membrane system and minimize chemical consumption associated with membrane cleaning (performed when the membrane fouling phenomenon becomes severe). The membrane tank 260 retains the solids, and produces filtrate, i.e. water. The water from the membrane tank 260 is pumped into the product water tank 270 via permeate pump, where the water in the product water tank 270 will be partially used to backwash the membranes via the backwash pump; in certain embodiments, the water can be mixed with either acid or sodium hypochlorite via an acid metering pump and sodium hypochlorite metering pump respectively to perform either acidic washing or caustic washing. Then the solids can be either discharged as excess solids via the wasting pump or returned to the first pH adjustment tank 210 via a recirculation pump; in certain embodiments, the recirculation rate is in the range of 50%-700% influent flow rate, which is the flowrate of wastewater entering the first pH adjustment tank, and preferably in the range of 300%-500%; as a result, overall solids content in the Fenton reaction tank 220 is elevated. Higher solids content in the Fenton reaction tank 220 enhances contaminant removals, reduces chemical consumption and lowers overall sludge production.

The present invention also provides a method for organic contaminants treatment. In brief, the organic contaminants treatment method integrates Fenton reaction and membrane filtration.

Figure 3:
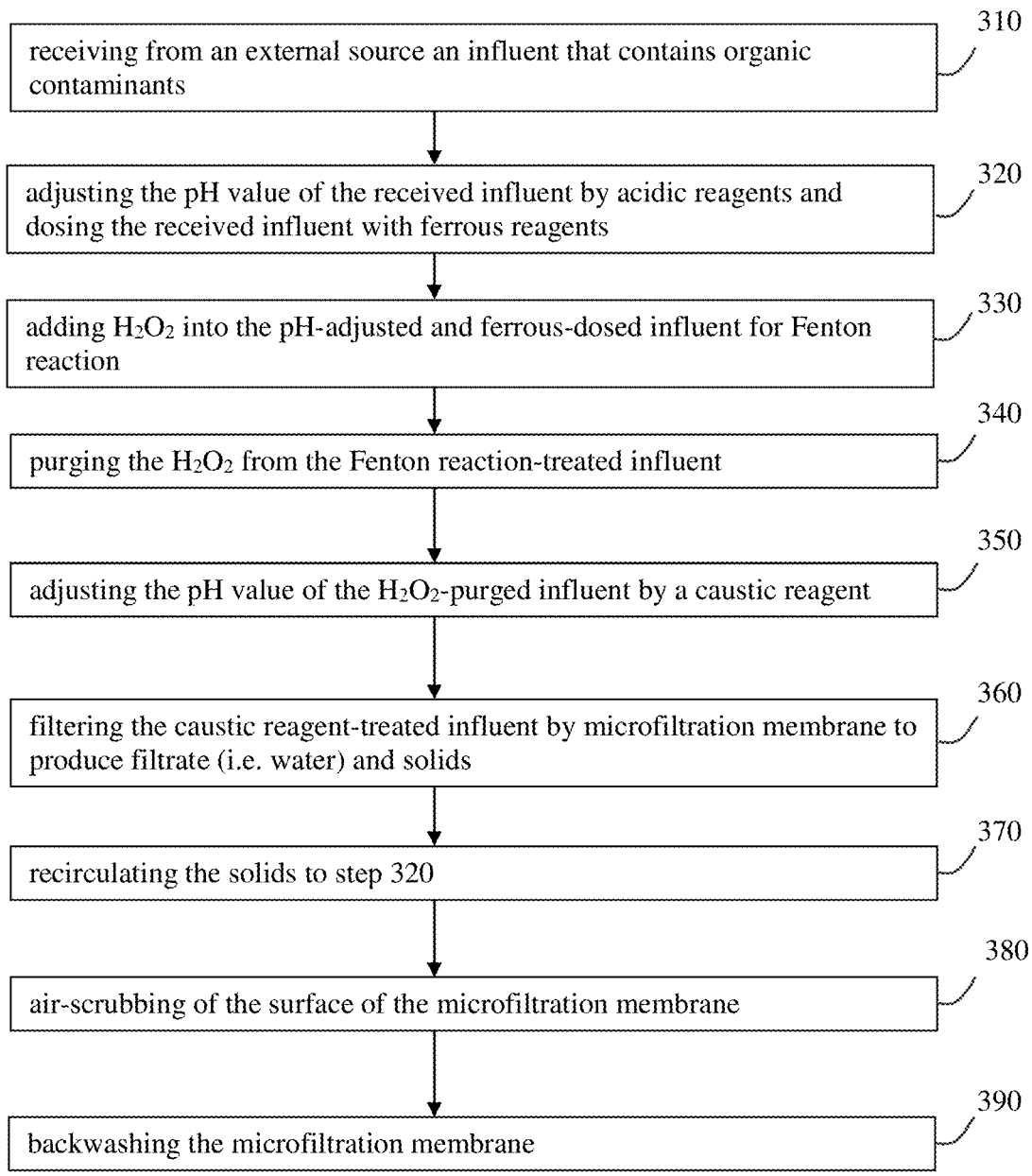
FIG. 3 shows a flow chart of the organic contaminants treatment method in accordance with embodiments of the present invention.

Referring now to FIG. 3, there is provided a flow chart of the organic contaminants treatment method in accordance with embodiments of the present invention. As shown in FIG. 3, the organic contaminants treatment method comprises:

receiving from an external source an influent that contains organic contaminants 310; the exemplary influents include wastewater streams from industrial processes, such as but not limited to petrochemical, tannery and pharmaceutical production; these wastewater streams have characteristically low biodegradability, which manifests as low biochemical oxygen demand (BOD) to chemical oxygen demand (COD) ratios (commonly known as B/C ratio) due to abundance of complex chemical structures in the influent;

adjusting the pH value of the received influent by acidic reagents and dosing the received influent with ferrous reagents 320; where the acidic reagents include most commonly available acids in the industry; in certain embodiments, the pH value of the pH adjusted influents is in the range of 2-6, preferably in the range of 3-4; where the ferrous reagents are preferably ferrous sulphates;

adding $H_2O_2$ into the pH-adjusted and ferrous-dosed influent for Fenton reaction 330; the Fenton reaction produces .OH hydroxyl radicals, providing strong but non-discriminatory oxidative degradation of organic contaminants in the pH-adjusted and ferrous-dosed influent; iron complexes, contaminants, and oxidation by-products in the influent, if in the form of colloidal or suspended solids (collectively termed as "solids") are formed after Fenton reaction; in certain embodiments, the following ranges of chemical dosage ratios are used:

$$\frac{H_2O_2}{COD_{influent}} = 0.1 \to 5 \text{ and } \frac{Fe^{2+}}{H_2O_2} = 0.1 \to 5$$

purging the $H_2O_2$ from the Fenton reaction-treated influent 340; in certain embodiments, the unreacted $H_2O_2$ is purged by a blower through diffusers;

adjusting the pH value of the $H_2O_2$-purged influent by a caustic reagent 350; the caustic reagent includes sodium hydroxide, either in the form of caustic soda pearls or liquid form; in certain embodiments, the pH value of the caustic reagent-treated influent is in the range of 7-10, preferably in the range of 6-8;

filtering the caustic reagent-treated influent by filtration (i.e. microfiltration or ultrafiltration) membrane to produce filtrate (i.e. water) and solids 360; where the solids are retained by a membrane tank housing the filtration membrane;

recirculating the solids from the membrane tank to step 320 370; in certain embodiments, the recirculation rate is in the range of 50%-700% influent flow rate, which is the flowrate of wastewater entering the first pH adjustment tank, and preferably in the range of 300%-500%; as a result, overall solids content for the Fenton reaction is elevated; higher solids content in the Fenton reaction enhances contaminant removals, reduces chemical consumption and lowers overall sludge production;

air-scrubbing of the surface of the filtration membrane 380; in certain embodiments, the air-scrubbing is performed by the blower; this is crucial to control the extent of foulant accumulation on the membrane surface; and backwashing the filtration membrane 390; in certain embodiments, the filtrate (i.e. water) from step 360 can be partially used to backwash the membrane; in certain embodiments, the water is mixed with either acids or sodium hypochlorite before being used for acidic or caustic backwashing.

The following examples are provided for the sole purpose of illustrating the principles of the present invention; it is by no means intended to limit the scope of the present invention.

EXAMPLES

Example 1—Effect of Solids Recirculation

Figure 1:
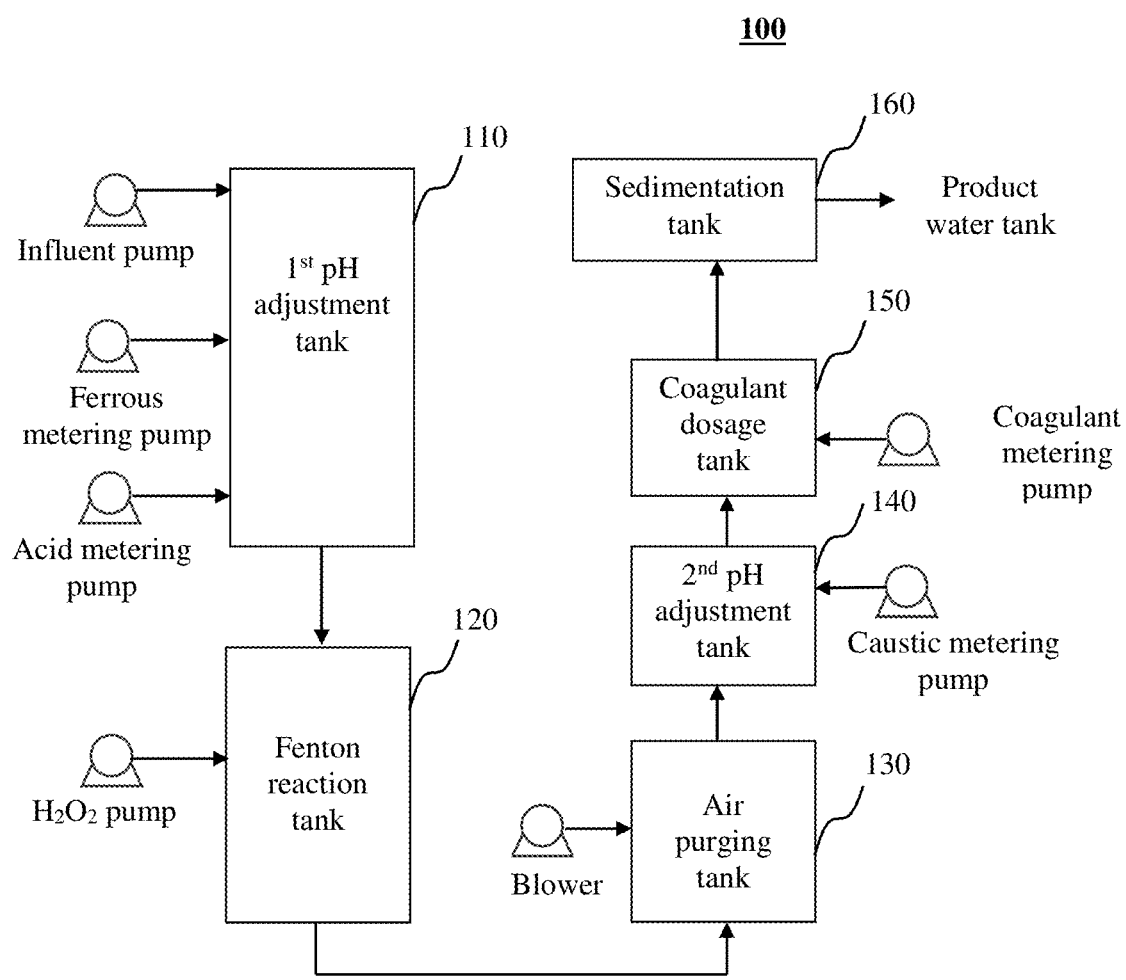
FIG. 1 shows a functional block diagram of a conventional Fenton reaction oxidation system.

A conventional Fenton Oxidation pilot system as shown in FIG. 1 and an organic contaminants treatment system as shown in FIG. 2 have been operated to treat the same wastewater influent stream. Their operating conditions are summarized in Table 1.

TABLE 1

The operating conditions of the conventional Fenton Oxidation pilot system and the organic contaminants treatment system

| | Parameters | Conventional Fenton Oxidation pilot system | Organic contaminants treatment system |
|---|---|---|---|
| Tank volume (Liters) | First pH adjustment tank | 180 | 180 |
| | Fenton reaction tank | 180 | 180 |
| | Air purging tank | 180 | 180 |
| | Second pH adjustment tank | 180 | 180 |
| | Coagulant dosage tank | 180 | N.A |
| | Sedimentation tank | Surface loading rate = 1.0 m³/m² · h | N.A |
| | Holding tank | N.A | 1000 |
| | Membrane tank | N.A | 400 |
| Influent flow (L/h) | | 380 | 150 |
| Acidic reagents (for First pH adjustment tank) | | Any commonly available acids | Any commonly available acids |
| Fenton reaction | HRT (mins) | 28 | 24 |
| | $H_2O_2$:$COD_{influent}$ | 1.9 | 1.5 |
| | $Fe^{2+}$:$H_2O_2$ | 1.2 | 0.3 |
| Air purging conditions | | 400% of influent flow rate | 400% of influent flow rate |
| Caustic reagents (for Second pH adjustment tank) | | Caustic soda pearls, 30% caustic soda | Caustic soda pearls, 30% caustic soda |
| Coagulant dosage tank | | Bypassed during experiment | N.A |

TABLE 1-continued

The operating conditions of the conventional Fenton Oxidation pilot system and the organic contaminants treatment system

| Parameters | | Conventional Fenton Oxidation pilot system | Organic contaminants treatment system |
|---|---|---|---|
| Holding tank | | N.A | Houses the lifting pump Continuous and complete mixing |
| Membrane system | Membrane flux (LMH) | N.A | 10-30 |
| | Membrane area ($m^2$) | N.A | 80 |
| | Permeation cycle | N.A | 9 min suction 1 min relaxation |
| | Maintenance cleaning frequency | N.A | Ranges from 1×/3 days → 1×/5 days |
| Recirculation conditions | | N.A | 50-700% of influent flowrate |

Figure 4:
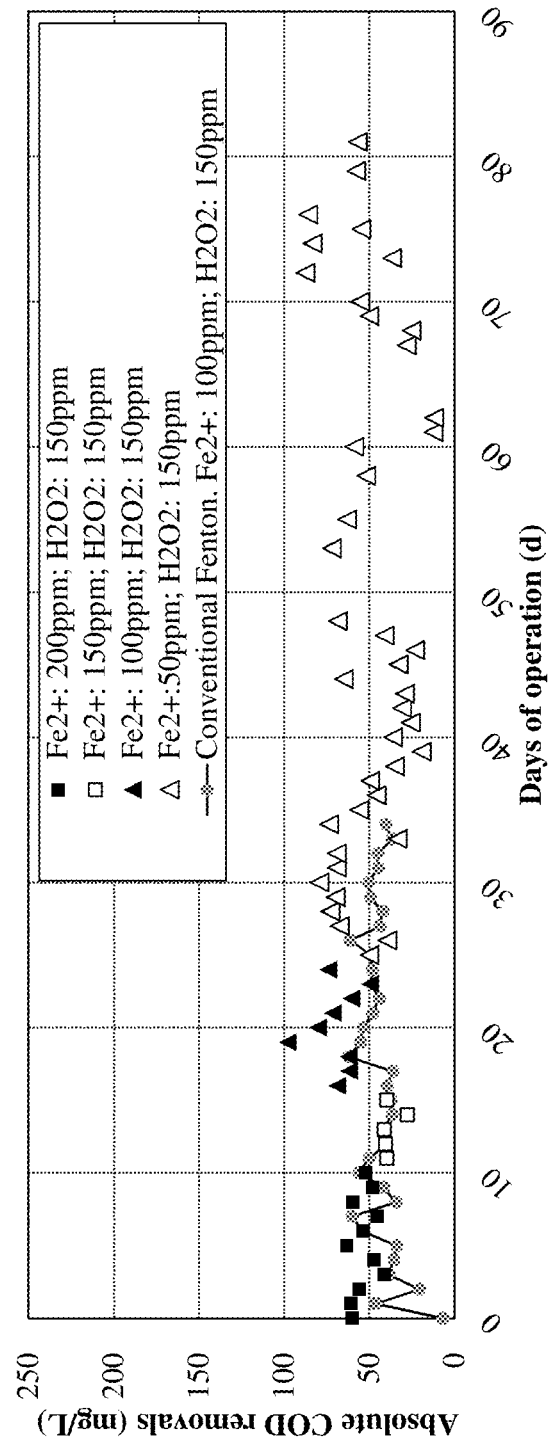
FIG. 4 is a dot graph showing the plot of absolute COD removals at different Fenton reagent dosages.

FIG. 4 is a dot graph showing the plot of absolute COD removals at different Fenton reagent dosages. As illustrated in FIG. 4, the experimental data demonstrated that the organic contaminants treatment system outperformed (in terms of COD removal) the conventional Fenton process for the same chemical dosage and even maintains the performance upon further dosage optimization.

The reason for enhanced COD removals can be understood as such: The recirculation of iron (III) complexes and solids back to the upstream Fenton reactors allow for their dissolution to form ferric ions, which catalyzes the Fenton-like oxidation process. Non-patent prior arts have examined Fenton-like reactions to demonstrate a 10% lower COD removal [10], but in the case of the present invention (a membrane-coupled Fenton process), the cyclic retention-recirculation-dissolution of the ferric species directly translates into reduction of ferrous catalyst dosages with a purported 10% performance compromise. The concept of cylic retention-recirculation-dissolution can be further illustrated with reference to FIG. 3; where step 370 utilizes a recirculation pump to recirculate ferric solids that has been retained in step 360 back to step 320 so that the retained ferric species can be made available via acid dissolution in step 320. Thus, the pH-adjusted and ferrous-dosed influent in step 320 is supplemented with ferric ions that were dosed into the organic contaminants treatment system at an earlier time. As both ferrous and ferric ions can participate in Fenton and Fenton-like oxidation within step 330, respectively, the reuse of ferric ions causes a lowered need for fresh ferrous dosage. The cycle is repeated when the caustic reagent-treated influent from step 350 is filtered by Microfiltration or Ultrafiltration membranes in step 360 and the ferric solids gets recirculated upstream again by step 370.

However, long term operations have proven that the 10% compromise does not exist and long-term performances remain elevated over the conventional counterpart even at lowered dosages. The discrepancy can be accounted for by the enhanced adsorptive removals by Solids of the iron species under high concentrations. The difference in Solids content is pronounced between the two systems, where the once-through conventional Fenton process averages 500 mg/L of MLSS readings while the organic contaminants treatment system operates at levels between 2000-10,000 ppm.

Example 2—Effect of Appropriate Membrane Cleaning Protocol

Figure 5:
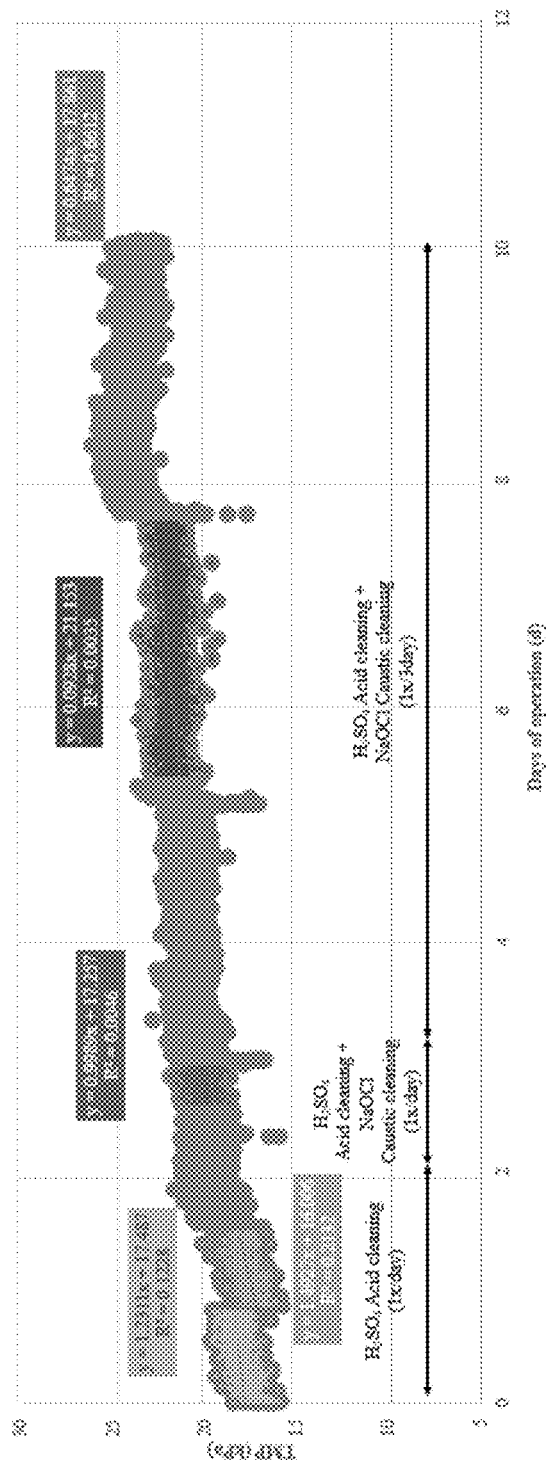
FIG. 5 is a graph showing the operating pressures of the organic contaminants treatment system under different membrane cleaning protocols.

In the initial stages of the operation of the organic contaminants treatment system, it was assumed that acid cleaning alone was sufficient to remove membrane fouling, which was logically assumed to be dominated by iron complex attachments (i.e. inorganic fouling). However, in the short-term fouling control study, it was found that acid cleaning alone is inadequate and a caustic cleaning (in succession to an acid cleaning) has been found to be critical to eliminate organic fouling. In particular, the respective cleaning reagents are added into a clean water stream via two chemical metering pump (one for acid addition and the other for Sodium hypochlorite addition). This stream is generated by the backwash pump and flows in a reverse direction into the membrane system, providing a driving force that allows attached contaminants (on the membrane surface) to be flushed out—a process known as chemical backwashing in the industry. During the acidic cleaning, only the acid metering pump and backwash pump is in operation, creating a final concentration of 0.5%-2% before entering the membrane system. Caustic cleaning commences immediately after the completion of the acidic cleaning, where the Sodium hypochlorite metering pump operates alongside the backwash pump to create a final concentration of 250 ppm. At the end of the caustic cleaning, the membrane system resumes normal water production operation. Results of the fouling study are disclosed on FIG. 5, where a combination of acid, hypochlorite and caustic cleaning is capable of stabilizing operational pressures (where fouling rates have transformed from an initial rate of ~12-1.5 kPa/day to 0.09 kPa/day, an approximate 90% decrement) and also reduce the frequencies of membrane cleaning (from 1×/day to 1×/3 days).

TABLE 2

Summary of cleaning conditions Parameters

| Stage 1: Acid cleaning | Acidic reagent | Any commonly available acids |
|---|---|---|
| | Backwashing concentration | 0.5%-2% |
| | Ratio of Backwash flowrate:Filtration rate | 1:1 |
| Stage 2: Caustic cleaning | Caustic reagent | Sodium hypochlorite |
| | Backwashing concentration | 250 ppm |
| | Ratio of Backwash flowrate:Filtration rate | 1:1 |

Figure 6:
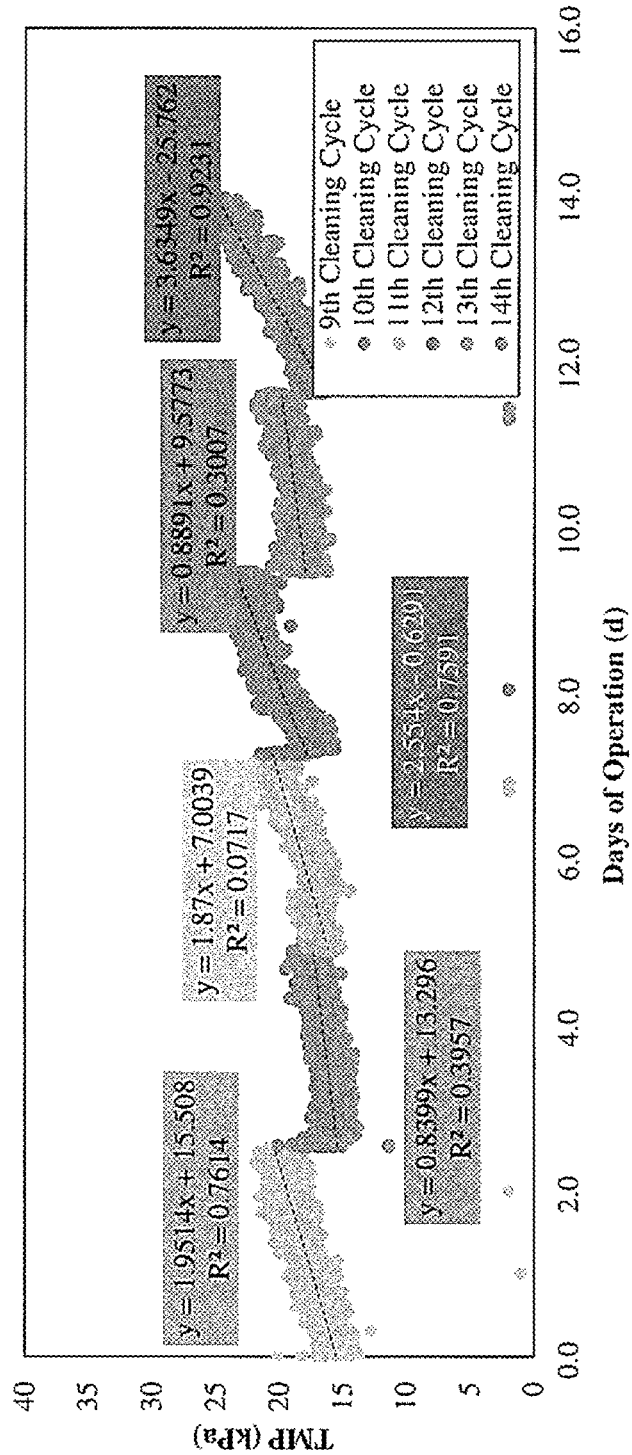
FIG. 6 is a graph showing the stability of operational pressures for the organic contaminants treatment system between the $9^{th}$-$14^{th}$ cleaning cycles.

This protocol was previously undiscussed in any prior arts and achieved long-term stability for the membrane-based Fenton process successfully. For a given cleaning frequency of 1×/3 days, the diagram on FIG. 6 illustrates the long-term pressure stability for the 9th to 14th cleaning cycle. It is evident that the introduction of caustic cleaning after an acid cleaning provided significant stability to the fouling phenomenon, where each cleaning is able to recover the initial TMP (15 kPa).

One of the key differences of the present invention than prior arts is that it is not a once-through process. The recirculation pump has made it possible for solids from the membrane tank to be recirculated to the upstream Fenton reaction stage with specified recirculation rates. Being coupled with the effective retention of solids by the membrane filtration stage, the system operates at higher but controllable solids contents (controlled via solids wasting rates, which is realized through the removal of solids from the membrane tank via the wasting pump—this act of solids removal allows for an engineered control of the operating solids level which can be determined via material balance.

The present invention has the following unprecedented advantages:

1) Chemical consumption reduction via promotion of Fenton-like oxidation: This is achieved when the recirculated solids undergo acidification in an upstream Fenton reaction stage, causing partial dissolution of the iron complexes to yield ferric ions. These ferric ions can participate in Fenton-like oxidation, reducing the need for fresh dosages of ferrous salts as catalysts.

2) Reduction of chemical consumption also directly reduces solids production, lowering costs for downstream solid wastes handling and disposal.

3) Increased contaminant removals via adsorptive processes.

While the present invention has been described with reference to particular embodiments, it will be understood that the embodiments are illustrative and that the invention scope is not so limited. Alternative embodiments of the present invention will become apparent to those having ordinary skill in the art to which the present invention pertains. Such alternate embodiments are considered to be encompassed within the spirit and scope of the present invention. Accordingly, the scope of the present invention is described by the appended claims and is supported by the foregoing description.

REFERENCES

1. Barbusiński, K., *Fenton reaction-controversy concerning the chemistry*. Ecological Chemistry and Engineering. S, 2009. 16(3): p. 347-358.
2. Goldstein, S., D. Meyerstein, and G. Czapski, *The Fenton reagents*. Free Radical Biology and Medicine, 1993. 15(4): p. 435-445.
3. Bernata, X., et al., *Recovery of iron (III) from aqueous streams by ultrafiltration*. Desalination, 2008. 221(1): p. 413-418.
4. Bernat, X., et al., *Non-enhanced ultrafiltration of iron(III) with commercial ceramic membranes*. Journal of Membrane Science, 2009. 334(1-2): p. 129-137.
5. Arsene, D., et al., *Combined oxidation and ultrafiltration processes for the removal of priority organic pollutants from wastewaters*. Environ Eng Manag J, 2011. 10(12): p. 1967-76.
6. Cailean, D., C. Teodosiu, and A. Friedl, *Integrated Sono-Fenton ultrafiltration process for 4-chlorophenol removal from aqueous effluents: assessment of operational parameters (Part 1)*. Clean technologies and environmental policy, 2014. 16(6): p. 1145-1160.
7. Yalili Kiliç, M., T. Yonar, and K. Kestioğlu, *Pilot-scale treatment of olive oil mill wastewater by physicochemical and advanced oxidation processes*. Environmental technology, 2013. 34(12): p. 1521-1531.
8. Cammarota, M., L. Yokoyama, and J. Campos, *Ultrafiltration, chemical and biological oxidation as process combination for the treatment of municipal landfill leachate*. Desalination and Water Treatment, 2009. 3(1-3): p. 50-57.
9. Primo, O., et al., *An Integrated Process, Fenton Reaction—Ultrafiltration, for the Treatment of Landfill Leachate: Pilot Plant Operation and Analysis*. Industrial & Engineering Chemistry Research, 2008. 47(3): p. 946-952.
10. Wang, S., *A comparative study of Fenton and Fenton-like reaction kinetics in decolourisation of wastewater*. Dyes and Pigments, 2008. 76(3): p. 714-720.

What is claimed is:

1. An organic contaminants wastewater treatment method, comprising:
   receiving from an external source wastewater that contains organic contaminants;
   adjusting pH value of the received wastewater by acidic reagents and dosing the received wastewater with ferrous reagents;
   adding $H_2O_2$ into the pH-adjusted and ferrous-dosed wastewater for Fenton reaction;
   purging the $H_2O_2$ from the Fenton reaction-treated wastewater;
   adjusting the pH value of the $H_2O_2$-purged wastewater by a caustic reagent; wherein the pH value of the caustic reagent-treated wastewater is in the range of 7-10; thereby iron (III) becomes insoluble to form iron (III) complexes in the form of iron hydroxide;
   filtering the caustic reagent-treated wastewater by filtration membrane to produce filtrate (i.e. water) and retain the iron (III) complexes and solids within a membrane tank housing the microfiltration or ultrafiltration membrane modules; wherein the membrane is operated at Trans-membrane Pressure (TMP) in the range of 10-30 kPa;
   recirculating the iron (III) complexes and solids at a recirculation rate to the step of adjusting pH value of the received wastewater by acidic reagents and dosing the received wastewater with ferrous reagents; wherein recirculation rate is in range of 50%-700% wastewater flow rate; and wherein the wastewater flow rate is the flowrate of wastewater entering the step of adjusting pH value of the received wastewater by acidic reagents and dosing the received wastewater with ferrous reagents;
   acidic cleaning the microfiltration or ultrafiltration membranes using a mixture of acid and water, wherein the water is from the filtering step; and
   caustic cleaning the microfiltration or ultrafiltration membranes using a mixture of caustic reagent and water, wherein the water is from the filtering step.

2. The organic contaminants wastewater treatment method of claim 1, wherein the acidic reagent is any acid suitable for pH adjustment.

3. The organic contaminants wastewater treatment method of claim 1, wherein the pH value of the pH adjusted influents is in the range of 2-6.

4. The organic contaminants wastewater treatment method of claim 1, wherein the pH value of the pH adjusted influents is in the range of 3-4.

5. The organic contaminants wastewater treatment method of claim 1, wherein a range of chemical dosage ratios are used:

$$\frac{H_2O_2}{COD_{influent}} = 0.1 \to 5 \text{ and } \frac{Fe^{2+}}{H_2O_2} = 0.1 \to 5.$$

6. The organic contaminants wastewater treatment method of claim 1, wherein the caustic reagent for adjusting the pH value of the $H_2O_2$-purged influent is sodium hydroxide.

7. The organic contaminants wastewater treatment method of claim 1, wherein the pH value of the caustic reagent-treated influent is in the range of 6-8.

8. The organic contaminants wastewater treatment method of claim 1, wherein the steps of acidic cleaning and caustic cleaning are performed sequentially.

9. The organic contaminants wastewater treatment method of claim 8, wherein the caustic reagent for the caustic cleaning is sodium hypochlorite and/or sodium hydroxide.

10. The organic contaminants wastewater treatment method of claim 1, further comprising air-scrubbing of the surface of the filtration membrane.

\* \* \* \* \*